UNITED STATES PATENT OFFICE.

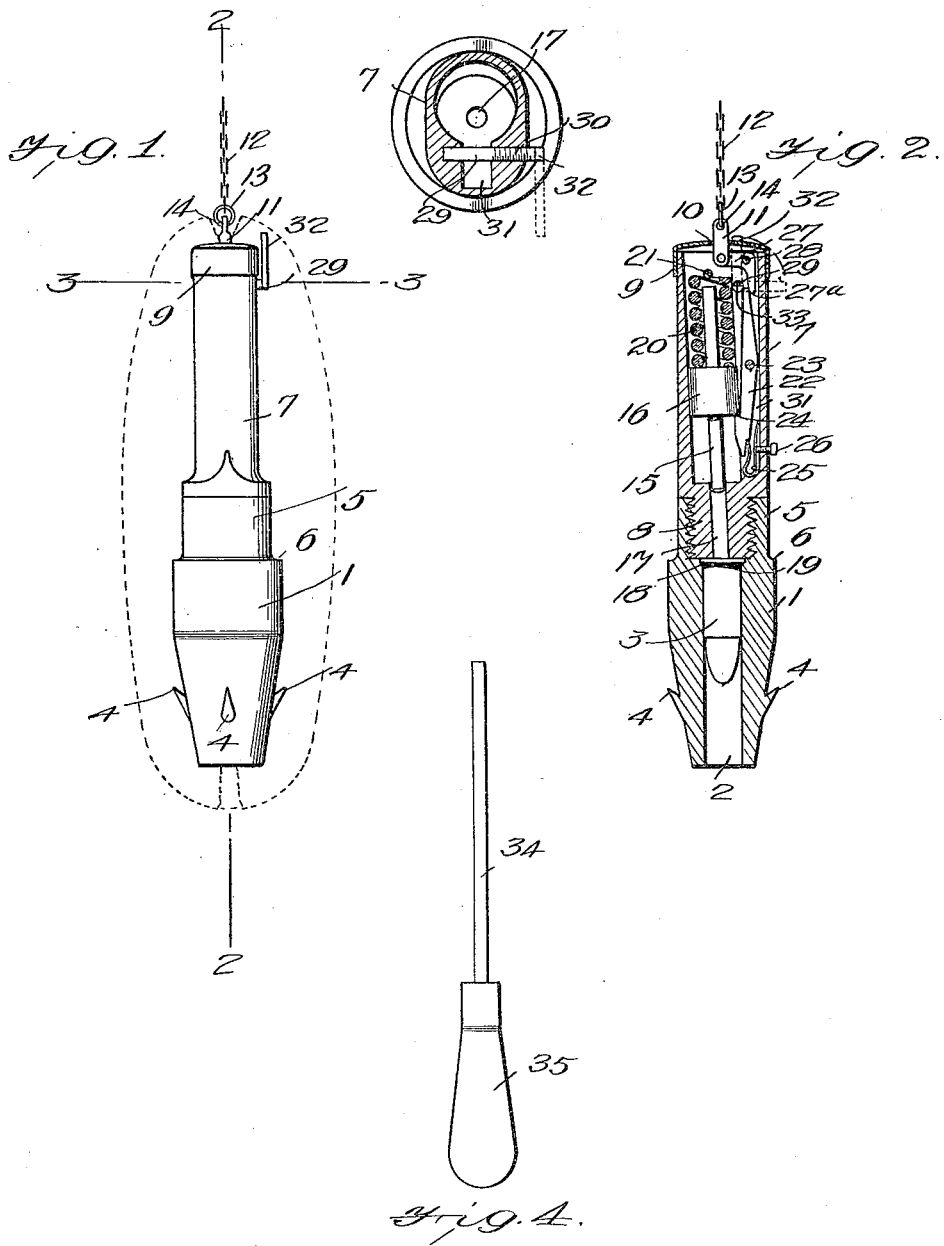

GEORGE W. MORTHLAND, OF LEAD, SOUTH DAKOTA.

TRAP.

1,136,432. Specification of Letters Patent. Patented Apr. 20, 1915.

Application filed March 12, 1914. Serial No. 824,135.

*To all whom it may concern:*

Be it known that I, GEORGE W. MORTHLAND, a citizen of the United States, and a resident of Lead, in the county of Lawrence and State of South Dakota, have made certain new and useful Improvements in Traps, of which the following is a specification.

My invention is an improvement in traps, and has for its object to provide a device of the character specified, wherein a holder is provided, having means for supporting bait, and having means for receiving and holding a cartridge, and the holder is provided with normally active mechanism for exploding the cartridge, the said mechanism being normally held in inoperative position by a trip, which is released by the animal, when the animal attempts to seize the bait.

A further object of the invention is to provide a device, small, light and compact, so that it may be easily hidden by the bait if desired.

A further object is to provide a device wherein the working parts are entirely hidden and concealed, and wherein the entire device is adapted to be concealed by the bait, to prevent the animal to be trapped from discovering the trap by the sense of smell.

A further object is to provide a trap which will be painless or nearly so in its operation, killing the animal instantly, instead of trapping the same and holding it to die from exposure or injury.

In the drawings: Figure 1 is a top plan view of the improved trap, Figs. 2 and 3 are sections on the lines 2—2, and 3—3, respectively, of Fig. 1, and Fig. 4 is a front elevation of the cocking tool and shell extractor.

The present embodiment of the invention comprises a barrel 1 of cylindrical shape and having a central longitudinal bore 2, the bore being of a diameter to receive an ordinary cartridge 3. The size of the bore will depend upon the caliber of the cartridge used, and it will be noticed that the barrel wall is thickened or reinforced at the breech, said barrel decreasing in size gradually or tapering from the breech toward the muzzle.

Bait holding spurs 4 are provided on the outer surface of the barrel at the tapering portion, the said spurs being integral lugs, pointing toward the breech of the barrel. The barrel is also provided with an internal threaded nipple 5 at the breech, the nipple being of less external diameter than the barrel, as shown, to form an annular shoulder 6 between the nipple and the barrel proper.

A casing 7 is connected with the nipple, the casing having a reduced externally threaded extension 8 at one end, which is threaded into the nipple. The casing 7 is elliptical in cross section, and a cap 9 is provided for closing the end remote from the extension. The cap is provided with a central opening 10, through which extends a link 11 to be later described, and a chain 12 or other flexible member is connected with the link, the chain having at one end a ring 13, which is passed through an opening 14 in the outer end of the link. A plunger or hammer is arranged within the casing, the said plunger comprising a rod or stem 15, provided intermediate its ends with a weight 16 of approximately cylindrical form, and one end of the rod 15 normally engages a central bore 17 in the extension 8.

That end of the bore 2 of the barrel adjacent to the nipple 5 is counterbored or reamed, as shown at 18, to receive the flange or rib 19 at the cap end of the cartridge. The engagement of this rib or flange with the shoulder formed between the counterbored portion and the body of the bore, limits the movement of the cartridge toward the muzzle of the barrel. The cartridges used are preferably central fire, that is having the cap holding fulminate at the center of the head of the cartridge, and the bore 17 of the extension 8 registers with the firing cap of the cartridge.

A coil spring 20 encircles that end of the rod 15 remote from the cartridge, and the spring bears at one end against the adjacent end of the weight 16, and acts normally to force the plunger rod toward the cartridge. At the opposite end the spring bears against a pin 21 arranged transversely of the casing, and a trip lever 22 is pivoted in the casing alongside the plunger rod. The lever is pivoted to the casing, as indicated at 23, and at the end adjacent to the plunger rod 15 the lever is provided with a catch 24 for engaging the end of the weight remote from the spring 20, to normally hold the plunger rod against the resistance of the spring. The catch 24 is normally held in engagement with the weight, by means of a substantially U-shaped spring 25. One end of the spring bears against the inner wall of the casing 7, and the other end bears against the adjacent end of the lever 22, and a set screw 26 is threaded through the casing wall, into engagement with the wall intermediate the ends of the spring, to permit the tension of the spring to be regulated.

An elbow lever consisting of arms 27 and 27ª is pivoted within the casing, on a pivot pin 28 which engages the elbow lever at the junction of the arms. The arm 27ª of the elbow lever is in position to engage the end of the lever 22 remote from the spring 25, and to move the said end in a direction to cause the catch 24 to release the weight, when the arm 27 of the elbow lever is moved outward by means of the link 11 before mentioned. The said link 11 is pivoted at its inner end to the arm 27.

A rod or shaft 29 is journaled transversely of the casing, adjacent to the end of the lever 22 engaged by the arm 27ª of the elbow lever 27—27ª. This shaft 29 is threaded at one end, as shown at 30, and the threaded portion of the shaft engages a threaded opening in the bore of the casing 7. It will be noted from an inspection of Fig. 3, that the casing 7 is a solid body which has been chambered to form a casing, and the said casing is provided with a substantially cylindrical bore arranged eccentrically, or nearer one end of the long axis of the casing than the other. The casing is also provided with a recess 31 which communicates with the bore, and in which the lever 22 is pivoted. The shaft 29 is journaled between the recess 31 and the bore of the casing, and the shaft is provided with an angular arm or handle 32 outside of the casing, by means of which the shaft may be oscillated. It will be noted from an inspection of Fig. 2, that at the recess 31 the shaft is cut away on one side, as indicated at 33, approximately half the thickness of the shaft being removed. The shaft is so arranged with respect to the adjacent end of the lever 22, that when the shaft is oscillated to bring the cut away portion 33 adjacent to the lever end, the shaft will not interfere with the movement of the lever, the end of the lever moving in the cut away portion, and as a consequence not touching the shaft. When however the shaft is oscillated, as indicated in dotted lines in Fig. 2, to bring the cut away portion 33 toward the spring 20, the adjacent end of the lever 22 will engage the shaft, to hold the catch 24 in engagement with the weight 16. So long as the shaft is in this position the lever cannot be operated to trip the plunger, and the plunger is held in safety position. As soon as the shaft is turned, as indicated in full lines in Fig. 2, the trap is ready for operation, and it will be evident that whenever the link 11 is moved longitudinally away from the trap to swing the elbow lever 27—27ª, the firing plunger or hammer will be released and will fire the cartridge.

The improved trap is used and operated in the following manner: By means of the tool to be later described, the parts of the trap are arranged as shown in Fig. 2, the firing plunger being moved toward the cap 9 until the catch 24 of the lever 22 is in engagement with the end of the weight 16. This weight 16 fits the cylindrical portion of the bore of the casing smoothly, and the said weight is of sufficient length to guide the firing plunger in its movement longitudinally of the casing. The spring 25 holds the lever 22 with the catch 24 in engagement with the weight 16, and the trap is ready for operation. It will be understood that the cartridge is inserted while the barrel 1 is detached from the casing, and to insert the cartridge, it is only necessary to unscrew the barrel from the extension 8. When the barrel is released from the extension, the cartridge is inserted in the bore 2 of the barrel, in the position shown in Fig. 2, after which the extension is again threaded into the nipple. After the cartridge has been inserted and the plunger has been set the barrel is returned to place. After the trap has been set as above described, the shaft 29 is oscillated by means of the handle 32, into the dotted line position of Fig. 2, that is in such position that the lever 22 cannot rock on its pivot point 23. The bait is now placed on the trap, preferably as indicated in dotted lines in Fig. 1, that is in such manner that the trap is concealed and covered, with the exception of the link 11 and the chain 12. The trap may be suspended by means of the chain, or may be laid upon the ground, the chain being connected to a fixed object, or a drag or clog. As soon as this has been done, the handle 32 is moved into the full line position of Fig. 2, and the trap is ready for operation. When an animal attempts to seize the bait, indicated in dotted lines, whether the animal swallows immediately or attempts to drag it away, traction will be made on the chain 12, and the elbow lever 27—27ª will be rocked on its pivot 28. The arm 27ª of the elbow lever will engage the adjacent end of the trip lever 22, and will swing the said end toward the firing plunger. The catch 24 will be moved out of engagement with the weight 16, thus releasing the firing plunger. The firing plunger will be forced toward the barrel by the spring 20, and the end of the plunger will engage the firing cap of the cartridge, exploding the same and firing the cartridge. The ball of the cartridge will strike the animal in a vital spot, since the trap will be in the animal's mouth, and the ball will almost certainly kill the animal immediately.

The device as a whole is small, of light weight, very compact, and absolutely safe when the shaft 29 is properly arranged.

Throughout the entire operation of placing the trap, the shaft 29 should be in the safety position, and should not be released or moved into operative position, until the trap has been released by the trapper. There is no possible chance of accident when this course is followed. Preferably the bait is omitted at the outer end of the bore of the barrel, as indicated in Fig. 1, so that the bullet or ball will have free egress from the barrel.

In Fig. 4 is shown a tool for setting the trap, and for extracting the shell. The said tool comprises a shank 34 of a diameter to enter the bore 17 of the extension 8, and a handle 35 is connected with one end of the shaft. The improved tool is used in the following manner: After the cartridge has been fired, the barrel 1 is unscrewed from the casing, and the shell is extracted by pushing it out with the shaft 34 of the tool, the shaft being entered from the outer end of the bore of the barrel. After the cartridge has been extracted, the end of the shank is inserted in the bore 17 of the extension 8, and the firing plunger is pressed toward the cap 9, until the catch 24 engages the weight 16 of the plunger, to hold the plunger in set position. The shaft 29 is now turned into safety position, after which a cartridge may be inserted, and the barrel may be replaced.

I claim:—

1. A trap of the character specified, comprising a barrel having a bore for receiving a cartridge, a casing detachably connected with the inner end of the barrel, a plunger movable longitudinally of the casing, a spring normally pressing the plunger toward the barrel, a trip lever within the casing for holding the plunger with the spring under compression, an elbow lever pivoted at the end of the casing remote from the barrel, and having one arm extending radially inward and having the other arm in position to engage the lever to move the same to release the plunger when the elbow lever is swung on its pivotal connection, said casing having an opening at the end remote from the barrel, a link connected with the first-named arm of the elbow lever and extending through the opening, and a chain connected with the link for suspending the gun, the trap being adapted to be inclosed in the bait and having means for holding the same.

2. A trap of the character specified, comprising a barrel having a bore for receiving a cartridge, a casing detachably connected with the inner end of the barrel, a plunger movable longitudinally of the casing, a spring normally pressing the plunger toward the barrel, a trip lever within the casing for holding the plunger with the spring under compression, means at the end of the casing remote from the barrel for engaging and swinging the lever to release the plunger, said casing having an opening at the end remote from the barrel, and means extending through the opening for suspending the trap and connected with the releasing means to release the same when traction is made on the trap.

GEORGE W. MORTHLAND.

Witnesses:
 NATHAN D. POOL,
 WILLIAM J. HARVEY.

Copies of this patent may be obtained for five cents each, by addressing the " Commissioner of Patents, Washington, D. C."